(12) United States Patent
Chen

(10) Patent No.: US 9,868,573 B1
(45) Date of Patent: Jan. 16, 2018

(54) RECYCLABLE CABLE TIE

(71) Applicant: Shih-Fang Chen, Taichung (TW)

(72) Inventor: Shih-Fang Chen, Taichung (TW)

( * ) Notice: Subject to any disclaimer, the term of this patent is extended or adjusted under 35 U.S.C. 154(b) by 0 days.

(21) Appl. No.: 15/392,015

(22) Filed: Dec. 28, 2016

(30) Foreign Application Priority Data

Oct. 13, 2016 (TW) .............................. 105133099 A

(51) Int. Cl.
*B65D 63/10* (2006.01)
(52) U.S. Cl.
CPC ..... *B65D 63/1072* (2013.01); *B65D 63/1081* (2013.01); *B65D 2563/101* (2013.01); *B65D 2563/108* (2013.01); *Y10T 24/1498* (2015.01)
(58) Field of Classification Search
CPC ............ Y10T 24/1498; B65D 63/1072; B65D 63/1081; B65D 2563/108; B65D 2563/101; B65D 63/10; B65D 63/1027; B65D 63/1063
See application file for complete search history.

(56) References Cited

U.S. PATENT DOCUMENTS 8,474,104 B2 * 7/2013 Watson .............. B65D 63/1063
24/16 PB

* cited by examiner

*Primary Examiner* — Abigail Troy
(74) *Attorney, Agent, or Firm* — Alan D. Kamrath; Kamrath IP Lawfirm, P.A.

(57) ABSTRACT

A recyclable cable tie has a single-aperture buckle, at least one multi-aperture buckle and a belt. The top of the single-aperture buckle is connected to the bottom of the most proximal multi-aperture buckle via the connecting tape. Each one of the at least one multi-aperture buckle has at least two up-down symmetrically arranged engaging cases. Each engaging case has an engaging pawl and an opening. Multiple unidirectional ratchets are formed on the top of the engaging pawl and extend up into the opening of the multi-aperture buckle. The belt is connected to the bottom of the single-aperture buckle. The belt may first engage with the single-aperture buckle, and the extra tail of the belt may be cut off. The extra tail that is cut off may be further used to engage with the multi-aperture buckles continuously so as to be recyclable.

4 Claims, 8 Drawing Sheets

RECYCLABLE CABLE TIE

BACKGROUND OF THE INVENTION

1. Field of the Invention

The present invention relates to a cable tie and, especially, to a recyclable cable tie.

2. Description of the Prior Arts

A conventional cable tie, as shown in FIG. 8, comprises a buckle 80 and a tape 90. The buckle 80 comprises an open case 81 composed of a pawl 811 and an opening 812. Multiple ratchets, extending up into the opening 812, are formed on the top of the pawl 811. The tape 90 having a tapered tip 91 on its end is integrated with the buckle 80, while multiple unidirectional ratchets are formed on the back surface of the tape 90.

Once the tapered tip 91 of the tape 90 has passed through the opening 812 of the open case 81, the unidirectional ratchets formed on the back surface of the tape 90 engage with the ratchets of the pawl 811 so that the tape 90 is prevented from being pulled back. The extra tail of the tape 90 may be cut off to be flush with the buckle 80. However, the cable ties are generally viewed as single-use devices. The extra tail is typically cut off and discarded rather than reused.

SUMMARY OF THE INVENTION

The objective of the present invention is to provide a recyclable cable tie with at least one multi-aperture buckle which may make the extra tail of the tape recyclable.

The recyclable cable tie comprises:

a single-aperture buckle having an open case including a combining pawl and an opening; with multiple first ratchets extending up into the opening formed on the combining pawl;

at least one multi-aperture buckle, with each of the at least one multi-aperture buckle having two engaging cases being up-down symmetrically arranged, with each one of the two engaging cases having:

an engaging pawl and an opening;
multiple unidirectional second ratchets formed on the engaging pawl and extending up into the opening of the engaging case;

a connecting tape connected between the single-aperture buckle and the multi-aperture buckle adjacent to the single-aperture buckle; and a belt connected to a bottom of the single-aperture buckle, with multiple teeth formed on a back surface of the belt.

Compared with the conventional single-use cable tie, the belt of the present invention may be first engaged with the single-aperture buckle, and the extra tail of the belt may be cut off. The extra tail which has been cut off may be further subsequently used to engage with the multi-aperture buckles so as to be recyclable.

DETAILED DESCRIPTION OF THE INVENTION

The objectives, features, advantages and implementations will be more readily appreciated upon reference to the following embodiments considered in conjunction with the accompanying drawings.

Figure 1:
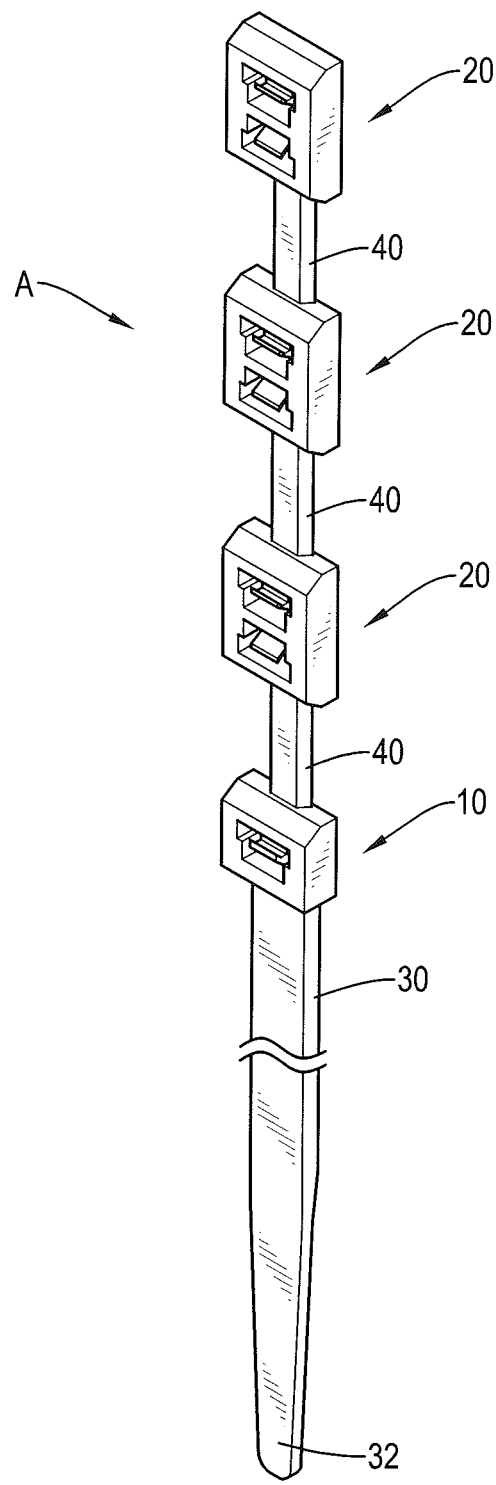
FIG. 1 is a perspective view of an embodiment of a recyclable cable tie of the present invention.
Figure 2:
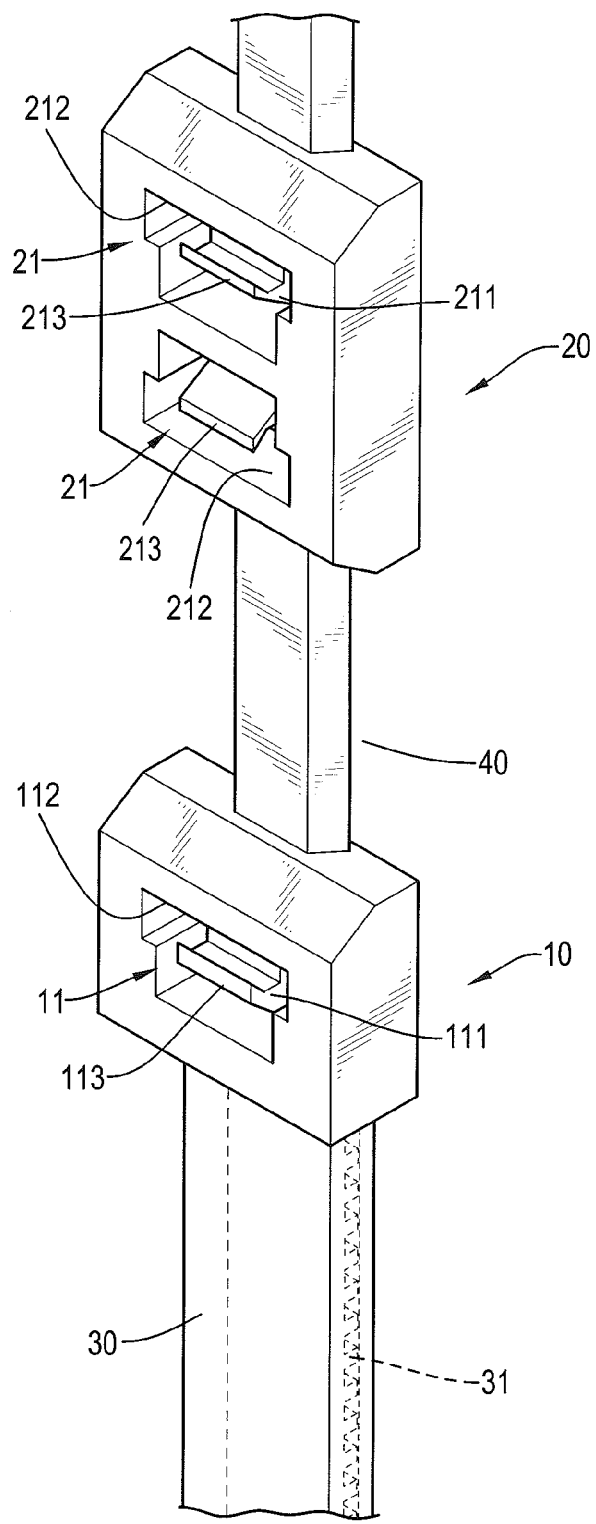
FIG. 2 is a partial enlarged view of the embodiment of the recyclable cable tie of the present invention.

As shown in FIG. 1 and FIG. 2, a recyclable cable tie A is made of plastic and comprises a single-aperture buckle 10, at least one multi-aperture buckle 20, a belt 30 and a connecting tape 40.

Figure 3:
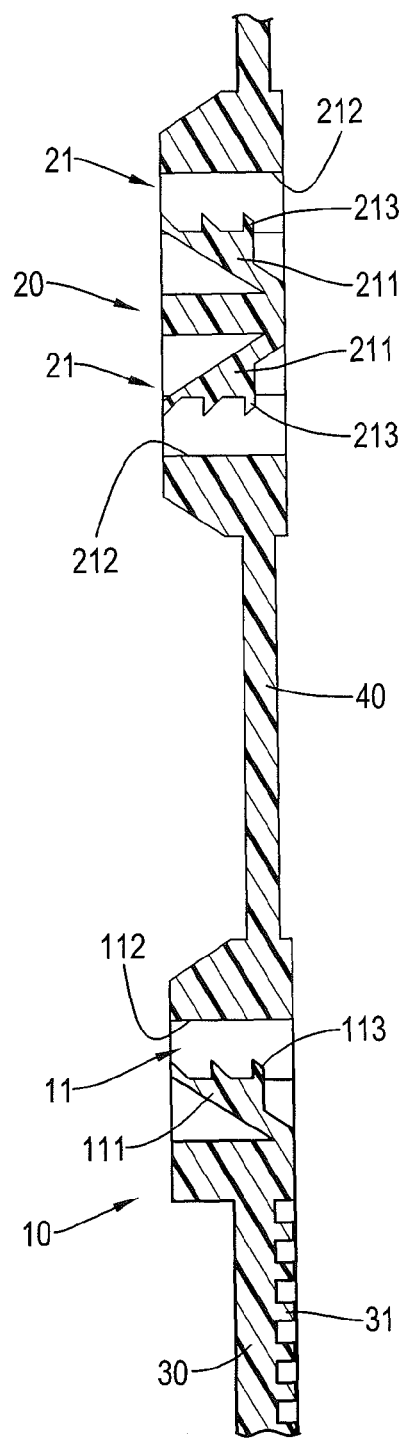
FIG. 3 is a cross-sectional view of the embodiment of the recyclable cable tie of the present invention.
Figure 4:
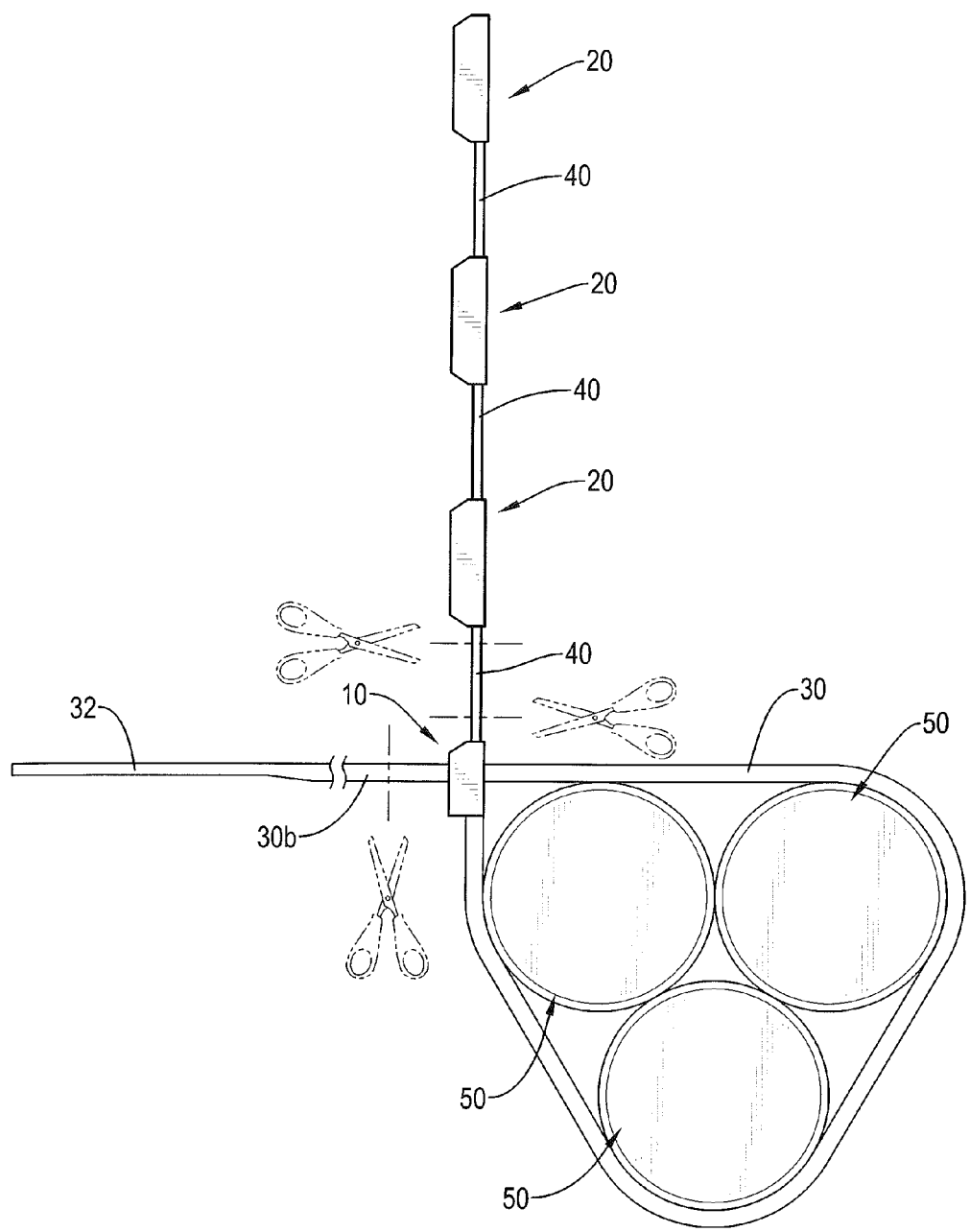
FIG. 4 is a first operational view of the embodiment of the recyclable cable tie of the present invention.

With reference to FIG. 1 to FIG. 3, the single-aperture buckle 10 has an open case 11 including a combining pawl 111 and an opening 112. Multiple first ratchets 113, extending up into the hollow opening 112, are formed on the top of the combining pawl 111.

As shown in FIG. 1 to FIG. 3, the top of the single-aperture buckle 10 is connected to the bottom of the most proximal multi-aperture buckle 20 via the connecting tape 40. Each one of the at least one multi-aperture buckle 20 has at least two engaging cases 21. As the at least two engaging cases 21 are up-down symmetrically arranged, only one of the at least two engaging cases 21 is described hereinafter. The engaging case 21 has an engaging pawl 211 and an opening 212. Multiple unidirectional second ratchets 213 are formed on a surface of the engaging pawl 211 and extend up into the opening 212. Preferably, the recyclable cable tie A has multiple multi-aperture buckles 20, with each two adjacent multi-aperture buckles 20 connected together by the connecting tapes 40 between them.

The belt 30 is a laminar strip connected to the bottom of the single-aperture buckle 10. One end of the belt 30 shrinks into a tapered tip 32 in order to pass through the open case 11 of the single-aperture buckle 10 or the engaging cases 21 of the multi-aperture buckle 20 smoothly. Furthermore, multiple teeth 31, with rectangular cross-sections, are formed on a back surface of the belt 30.

As shown in FIG. 1 to FIG. 4, for the initial use of the recyclable cable tie A, the belt 30 is twined around articles 50 to be tied up by the belt 30. Once the tapered tip 32 of the belt 30 has passed through the opening 112 of the open case 11, the teeth 31 of the belt 30 are engaged with the first ratchets 113 of the combining pawl 111 of the open case 11. The extra tail of the belt 30 may be cut off as a cut belt 30b to be flush with the single-aperture buckle 10. The connecting tape 40 between the single-aperture buckle 10 and the most proximal multi-aperture buckle 20 may be cut off, too.

Figure 5:
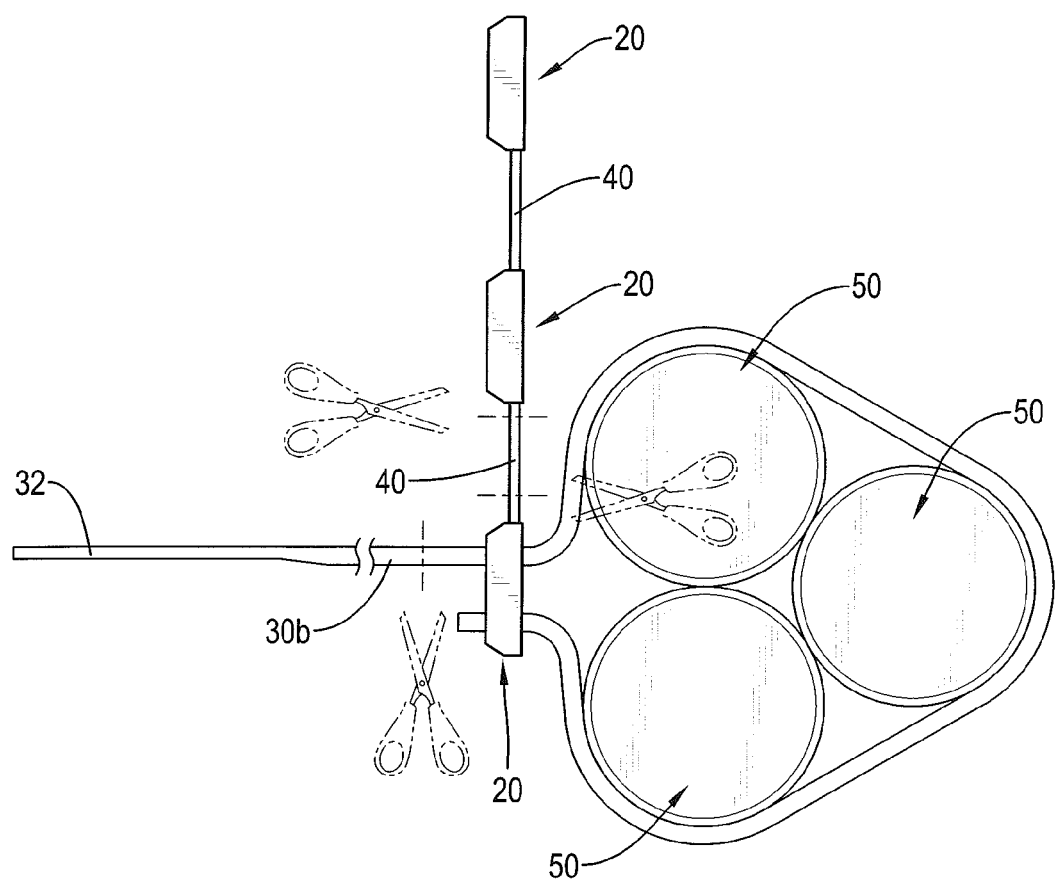
FIG. 5 is a second operational view of the embodiment of the recyclable cable tie of the present invention.
Figure 6:
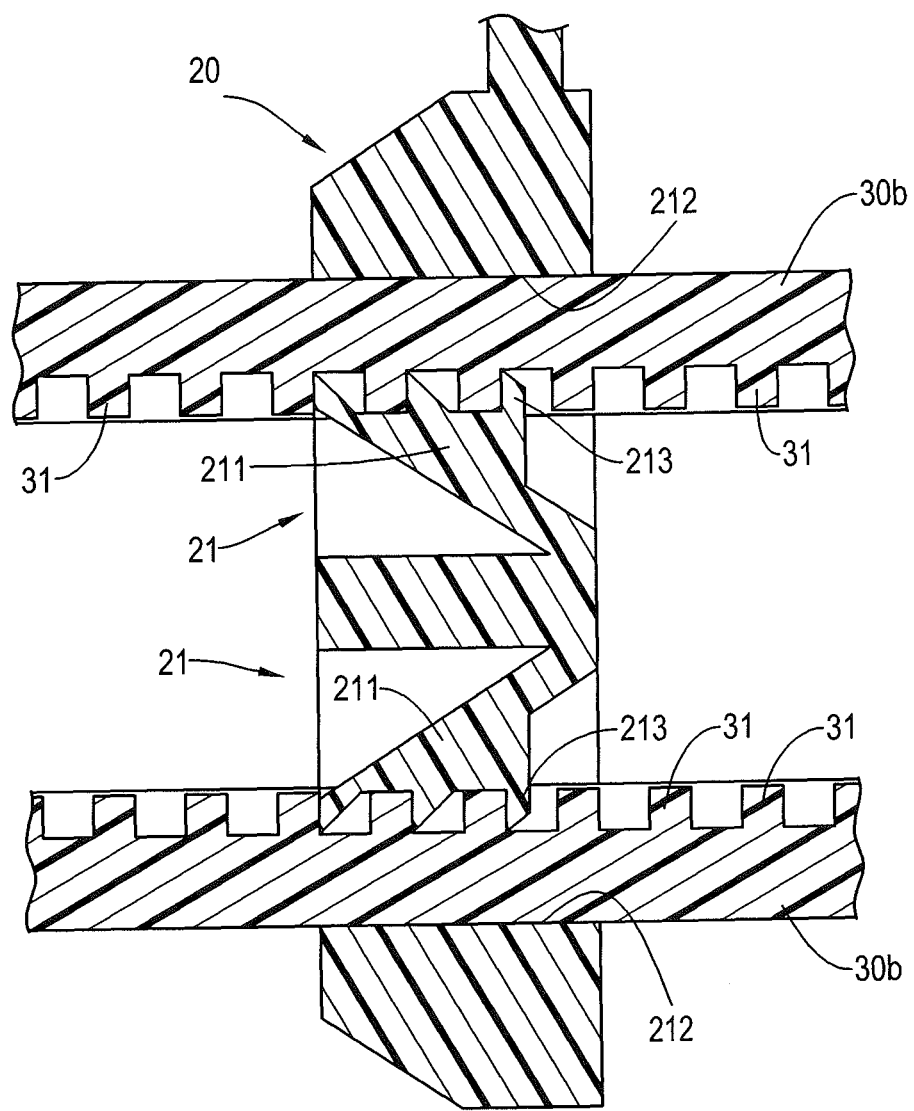
FIG. 6 is a cross-sectional view of a multi-aperture buckle of the recyclable cable tie of the present invention.

As shown in FIG. 5 and FIG. 6, the two terminals of the cut belt 30b come around the articles 50 and pass through the openings 212 of the two engaging cases 21 of the multi-aperture buckle 20. As shown in FIG. 6, the teeth 31 of the cut belt 30b are engaged with the unidirectional second ratchets 213 of the engaging pawls 211. The cut belt 30b may be further cut off to be flush with the multi-aperture buckle 20.

Figures 7A, 7B:
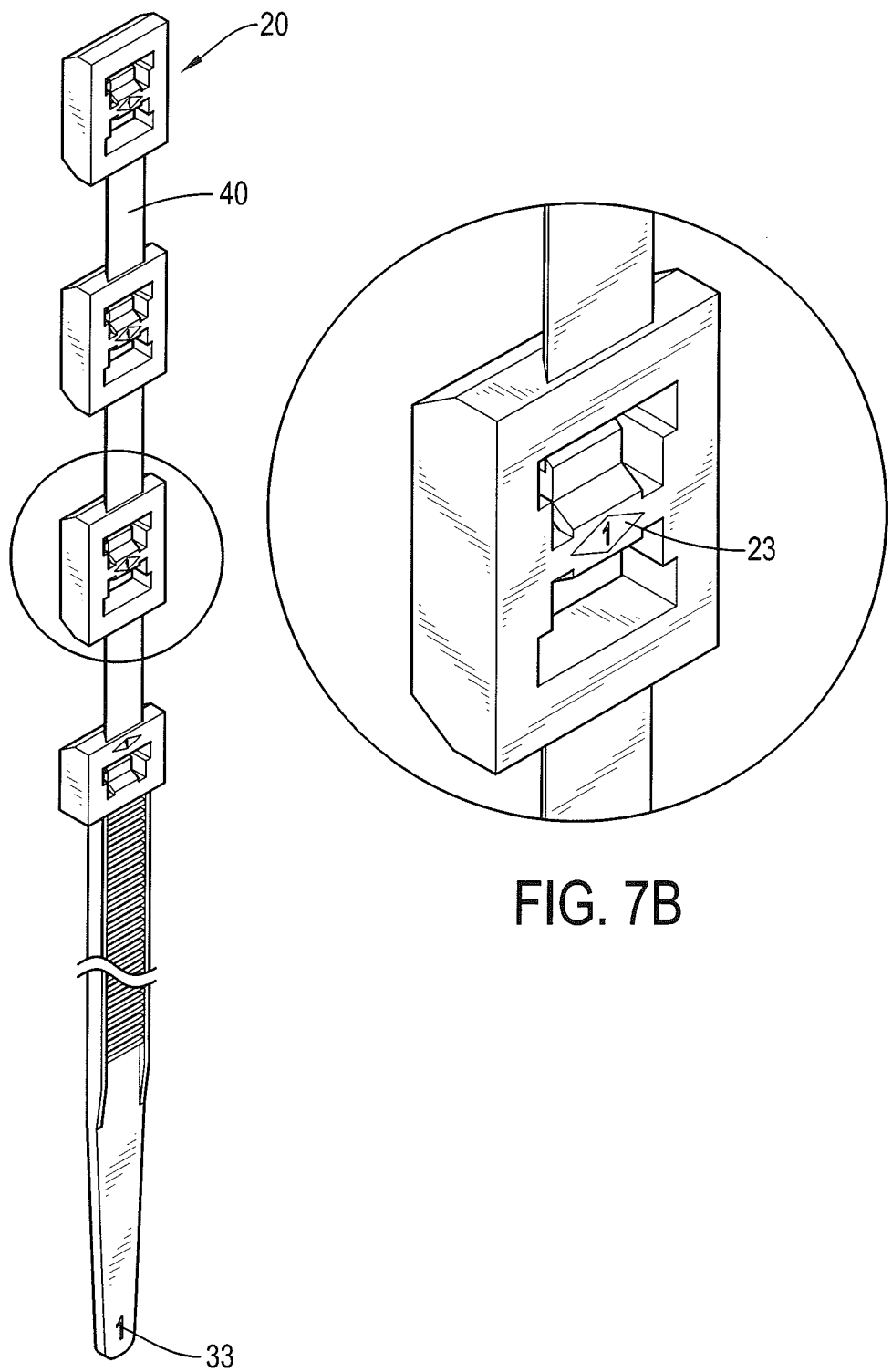
FIG. 7A is a perspective view showing the back side of the recyclable cable tie of the present invention.
FIG. 7B is an enlarged view showing the back surface of the multi-aperture buckle.
Figure 8:
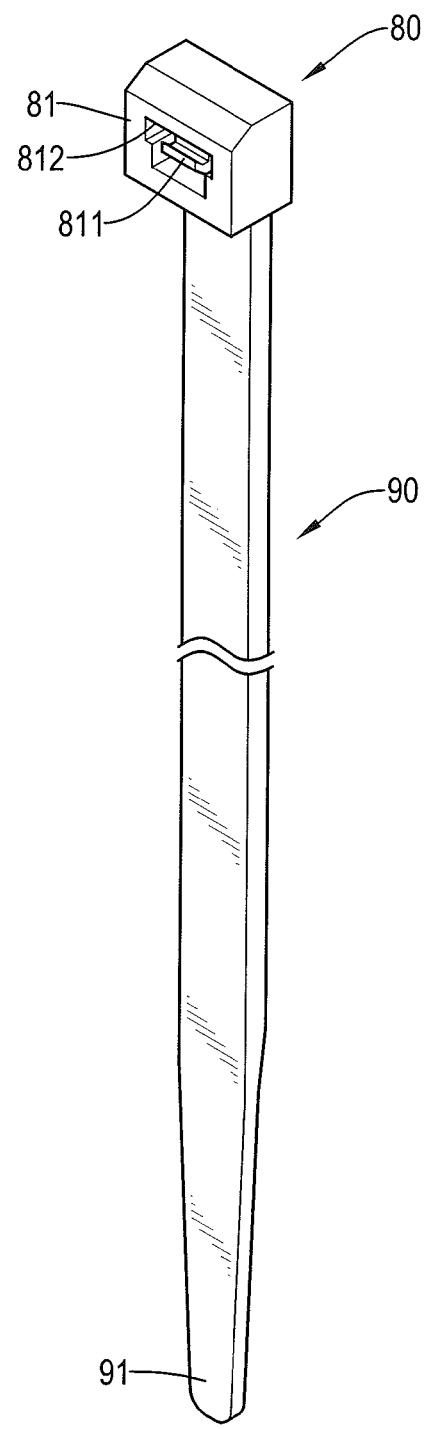
FIG. 8 is a perspective view of a conventional cable tie.

With reference to FIGS. 7A and 7B, to indicate the size of the recyclable cable tie, a first indication label 23 is set on a back surface of each one of the at least one multi-aperture buckle 20, and a second indication label 33 is provided on the back surface of the belt 30 near the tapered tip 32. The first indication label 23 and the second indication label 33 may be the same numeral or letter. For different sizes of recyclable cable tie, different numerals or letters may be used.

By repeating the above steps, the subsequent cut belt 30 may be engaged with the multi-aperture buckles 20 continuously. Compared with the conventional single-use cable ties, the belt 30 of the present invention may be reused by the multi-aperture buckles 20, showing the advantage of saving materials and being recyclable.

What is claimed is:

1. A recyclable cable tie comprising:
    a single-aperture buckle having an open case including a combining pawl and an opening; wherein multiple first ratchets extending up into the opening are formed on the combining pawl;
    multiple multi-aperture buckles, with each of the multiple multi-aperture buckles having two engaging cases being horizontally symmetrical to each other, with each one of the two engaging cases having:
        an engaging pawl and an opening;
        multiple unidirectional second ratchets formed on the engaging pawl and extending up into the opening of the engaging case;
    multiple connecting tapes connecting the single-aperture buckle and the multiple multi-aperture buckles, wherein one of the multiple connecting tapes is connected between the single-aperture buckle and one of the multiple multi-aperture buckles adjacent to the single-aperture buckle, and wherein remaining ones of the multiple connecting tapes are each connected between two adjacent ones of the multiple multi-aperture buckles; and
    a belt connected to a bottom of the single-aperture buckle, wherein multiple teeth are formed on a back surface of the belt, and wherein a cross-section of each one of the multiple teeth is rectangular.

2. The recyclable cable tie as claimed in claim 1, wherein the belt shrinks at one end to form a tapered tip on the one end.

3. The recyclable cable tie as claimed in claim 2, wherein a first indication label is provided on a back surface of each multi-aperture buckle, and wherein a second indication label corresponding to the first indication label is provided on the back surface of the belt.

4. The recyclable cable tie as claimed in claim 1, wherein a first indication label is provided on a back surface of each multi-aperture buckle, and wherein a second indication label corresponding to the first indication label is provided on the back surface of the belt.

* * * * *